US006917746B2

(12) United States Patent
Simmons et al.

(10) Patent No.: US 6,917,746 B2
(45) Date of Patent: Jul. 12, 2005

(54) APPARATUS AND METHOD FOR CREATING A FIBER OPTIC CIRCUIT

(75) Inventors: Richard L. Simmons, Leander, TX (US); Michael A. Meis, Stillwater, MN (US); Nicholas A. Lee, Woodbury, MN (US); Gordon D. Henson, Lake Elmo, MN (US); Monte L. Otts, Georgetown, TX (US); Luke Carlson, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 277 days.

(21) Appl. No.: 10/322,098

(22) Filed: Dec. 17, 2002

(65) Prior Publication Data

US 2004/0114902 A1 Jun. 17, 2004

(51) Int. Cl.[7] .............................. G02B 6/00; G02B 6/46
(52) U.S. Cl. ......................................... 385/137; 385/14
(58) Field of Search ........................... 385/14, 136, 137

(56) References Cited

U.S. PATENT DOCUMENTS

| | | | |
|---|---|---|---|
| 4,894,060 A | | 1/1990 | Nestegard |
| 5,077,870 A | | 1/1992 | Melbye et al. |
| 5,317,662 A | * | 5/1994 | Hotea ........................... 385/46 |
| 5,442,725 A | * | 8/1995 | Peng ........................... 385/135 |
| 5,902,435 A | | 5/1999 | Meis et al. |
| 6,259,851 B1 | * | 7/2001 | Daoud ......................... 385/135 |
| 6,285,815 B1 | | 9/2001 | Daoud |
| RE37,489 E | * | 1/2002 | Anton et al. .................. 385/53 |
| 6,353,697 B1 | | 3/2002 | Daoud |
| 6,367,128 B1 | | 4/2002 | Galkiewicz et al. |
| 6,389,211 B1 | | 5/2002 | Mandry et al. |
| 6,427,034 B1 | | 7/2002 | Meis et al. |
| 6,540,312 B1 | * | 4/2003 | Lane ....................... 312/223.6 |
| 6,718,112 B1 | * | 4/2004 | Rodriguez et al. .......... 385/137 |
| 2001/0013277 A1 | | 8/2001 | Galkiewicz et al. |
| 2001/0018785 A1 | | 9/2001 | Galkievicz et al. |
| 2003/0174996 A1 | * | 9/2003 | Henschel et al. ........... 385/135 |
| 2004/0086255 A1 | * | 5/2004 | Botet et al. ................. 385/137 |
| 2004/0151465 A1 | * | 8/2004 | Krampotich et al. ........ 385/136 |

FOREIGN PATENT DOCUMENTS

| | | |
|---|---|---|
| EP | 0 368 445 A2 | 5/1990 |
| EP | 1 037 081 A1 | 9/2000 |
| JP | 11-174264 | 7/1999 |
| WO | WO 01/58302 A1 | 8/2001 |
| WO | WO 01/58780 A1 | 8/2001 |

* cited by examiner

*Primary Examiner*—Michelle R. Connelly-Cushwa
(74) *Attorney, Agent, or Firm*—Gregg H. Rosenblatt

(57) ABSTRACT

An apparatus for routing optical fibers to create a fiber optic circuit includes a substrate and a plurality of retaining structures on the substrate. The retaining structures removably retain an optical fiber adjacent the substrate.

32 Claims, 20 Drawing Sheets

APPARATUS AND METHOD FOR CREATING A FIBER OPTIC CIRCUIT

FIELD OF THE INVENTION

The present invention generally relates to optical circuits. More particularly, the invention relates to an apparatus and method for routing optical fibers to create optical circuits.

BACKGROUND OF THE INVENTION

The design of electronic circuits requires interconnections between devices for proper operation. With increased sophistication and operational speeds, the design and fabrication of functional interconnections requires careful engineering. The fastest data processing circuits and emerging technologies require large numbers of interconnects capable of carrying extremely high-speed signals. Due to the increasing push for higher and higher speeds, engineers are facing fundamental limitations in designing electronic interconnects.

In an attempt to handle higher signal speeds and increased data transmission rates, interconnection technology has turned to optical interconnects for the next generation of circuits. Optical circuits have bandwidth capabilities orders of magnitude beyond similar electronic circuits, and are inherently immune to electrical interference. In some known designs, discrete fiber optic cables and fiber bundles are used to interconnect devices. Known standard fiber optic connection technology employed to fabricate optical circuits and connect optical fibers to devices is adequate for small numbers of interconnections. However, as optical circuit density grows, the physical bulk of fiber optic cables and connectors makes current approaches unwieldy.

Fabrication of certain kinds of fiber-based optical circuits is known in the art. For example, it is known that optical circuits may be fabricated by adhesively bonding or embedding optical fibers, using pressure sensitive adhesives (PSA) or partially cured monomers coated on laminating films. The adhesive and optical fiber assembly can then be further protected by, for example, applying a cover layer, curing the adhesive, or flood coating and curing. In each case, the finished assembly consists of optical fibers held firmly in place in an intermediate layer of a multi-layer assembly.

However, there are certain problems associated with the use of adhesive, as used on coated films and the like. For instance, within the optical circuit, the optical fibers are firmly fixed in place. Once assembled, it can be difficult or impossible to add, remove, or replace a given optical fiber to repair or update the circuit design. In addition, the optical fibers embedded in such designs restrict the flexibility of the assembly, and the fibers may be placed under undesirable levels of stress if the assembly is bent or forced to conform to a non-planar surface. Fibers that cross over each other due to requirements of the circuit pattern may be subjected to microbending stresses and associated optical loss as the circuit layers are laminated together. Fibers rigidly held in such optical circuit assemblies may also exhibit increased bending loss caused by temperature-induced stress.

Attempts have been made to address the problems discussed above. In U.S. Pat. Nos. 5,902,435 and 6,427,034 to Meis, et al., flexible optical circuit appliqués that allow for repositioning of the optical circuits to achieve proper alignment are shown. The flexible optical circuit appliqués of Meis, et al., provide microstructures on a backing layer, such that the microstructures prevent the adhesive coating on the backing layer from immediately adhering to a substrate. In this manner, the optical fiber may be repositioned until proper alignment has been achieved. In one embodiment, upon application of appropriate force, the microstructures will crush and thereby allow the adhesive coating to bond the film to a substrate. The microstructures additionally provide a guide for routing optical fibers in precise locations as they are applied to the adhesive surface. However, some of the disadvantages of adhesive mentioned above still remain.

A need still exists for optical circuits that allow the addition, removal, or replacement of optical fibers in an optical circuit after its initial assembly, and that reduce or eliminate undesirable stresses, which lead to optical loss. A method of fabricating optical circuits that provide such benefits is also needed.

SUMMARY OF THE INVENTION

The present invention provides an apparatus for routing optical fibers to create a fiber optic circuit. The apparatus includes a substrate and a plurality of retaining structures on the substrate. The retaining structures removably retain optical fibers adjacent the substrate, such that optical fibers may be added, removed, or replaced after the initial assembly of the optical circuit. The retaining structures are arranged to reduce or eliminate undesirable stresses in the optical fibers that lead to optical losses.

The retaining structures are positioned upon the substrate to form channels between adjacent retaining structures, such that one or more optical fibers may be positioned in the channels. In one embodiment according to the invention, the retaining structures are arranged in a plurality of clusters on the substrate, where the clusters are spaced from each other by a distance on the same order of magnitude as the minimum bend radius of the optical fibers.

The retaining structures have enlarged head portions to aid in retaining optical fibers adjacent the substrate. In one embodiment according to the invention, the retaining structures are resiliently deformable to aid in inserting or removing optical fibers from the retaining structures.

In various embodiments according to the invention, the substrate may be a separate and discrete element, such as a panel, or the substrate may alternately be an integral surface of another device. If the substrate is a discrete element, interlocking structures may be provided on a periphery of the substrate for joining a plurality of substrates to form a larger element. The substrate may be planar or non-planar, rigid or flexible.

The present invention further provides a method for forming a fiber optic circuit. The method comprises providing a substrate having a plurality of retaining structures, wherein the retaining structures define channels therebetween. An optical fiber is routed across the substrate on a predetermined pattern and inserted into the channels between the retaining structures. The optical fibers are then loosely retained adjacent the substrate by the retaining structures.

BRIEF DESCRIPTION OF THE DRAWINGS

FIG. 3I is a top view of the optical circuit resulting from the routing of optical fibers as shown in FIGS. 3A–3H.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1A:
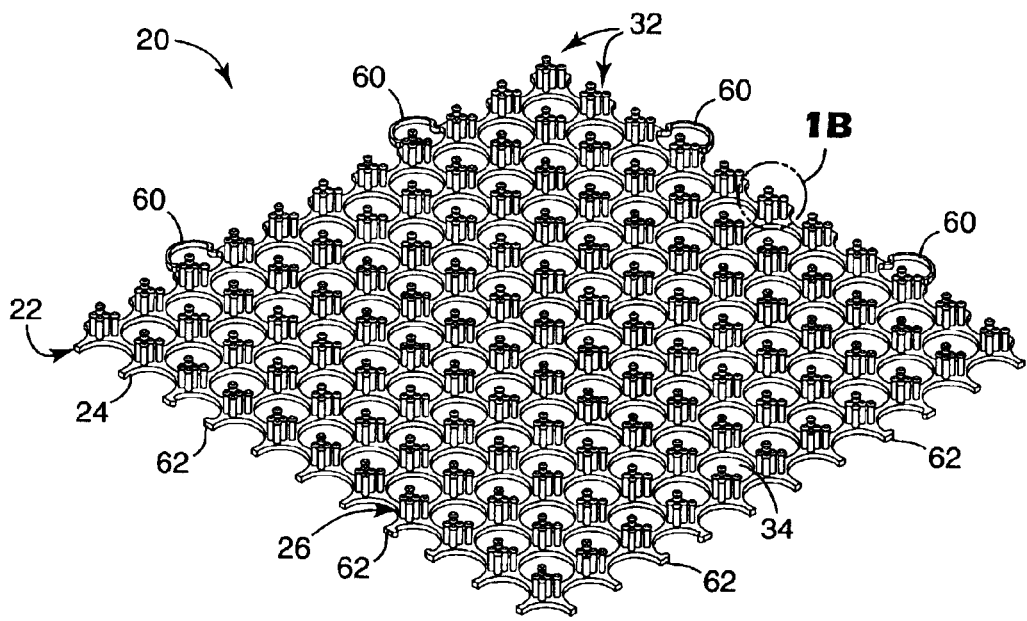
FIG. 1A is a perspective view of one embodiment of a fiber optic circuit matrix according to the invention.
Figure 1B:
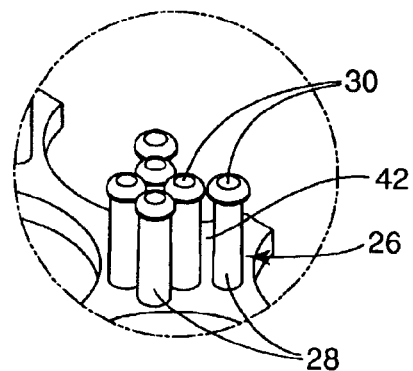
FIG. 1B is a greatly enlarged perspective view of the circled portion "A" of FIG. 1A.
Figure 6A:
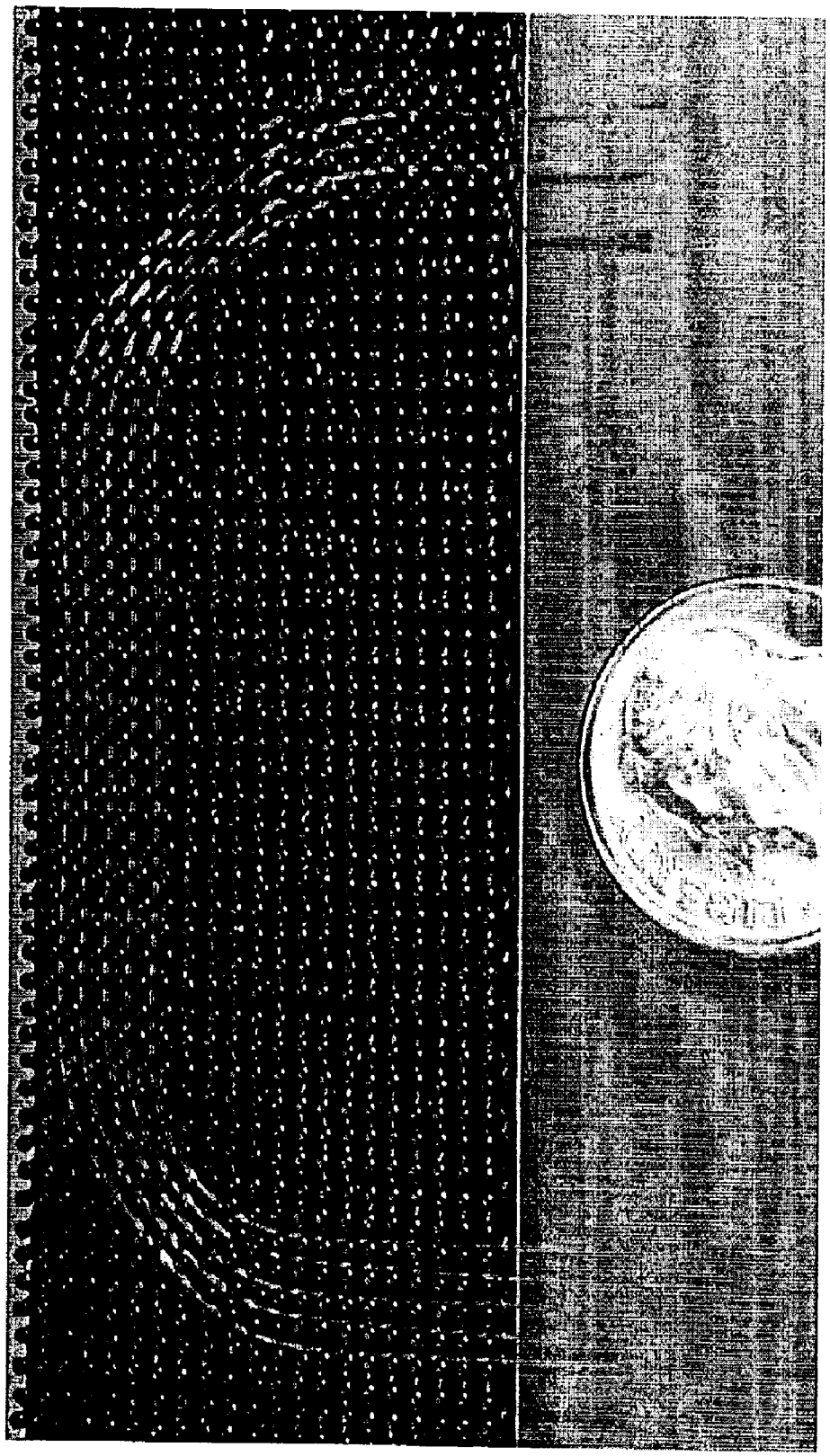
FIGS. 6A–6C are photographs showing additional embodiments of a fiber optic circuit matrix according to the invention.
Figure 6B:
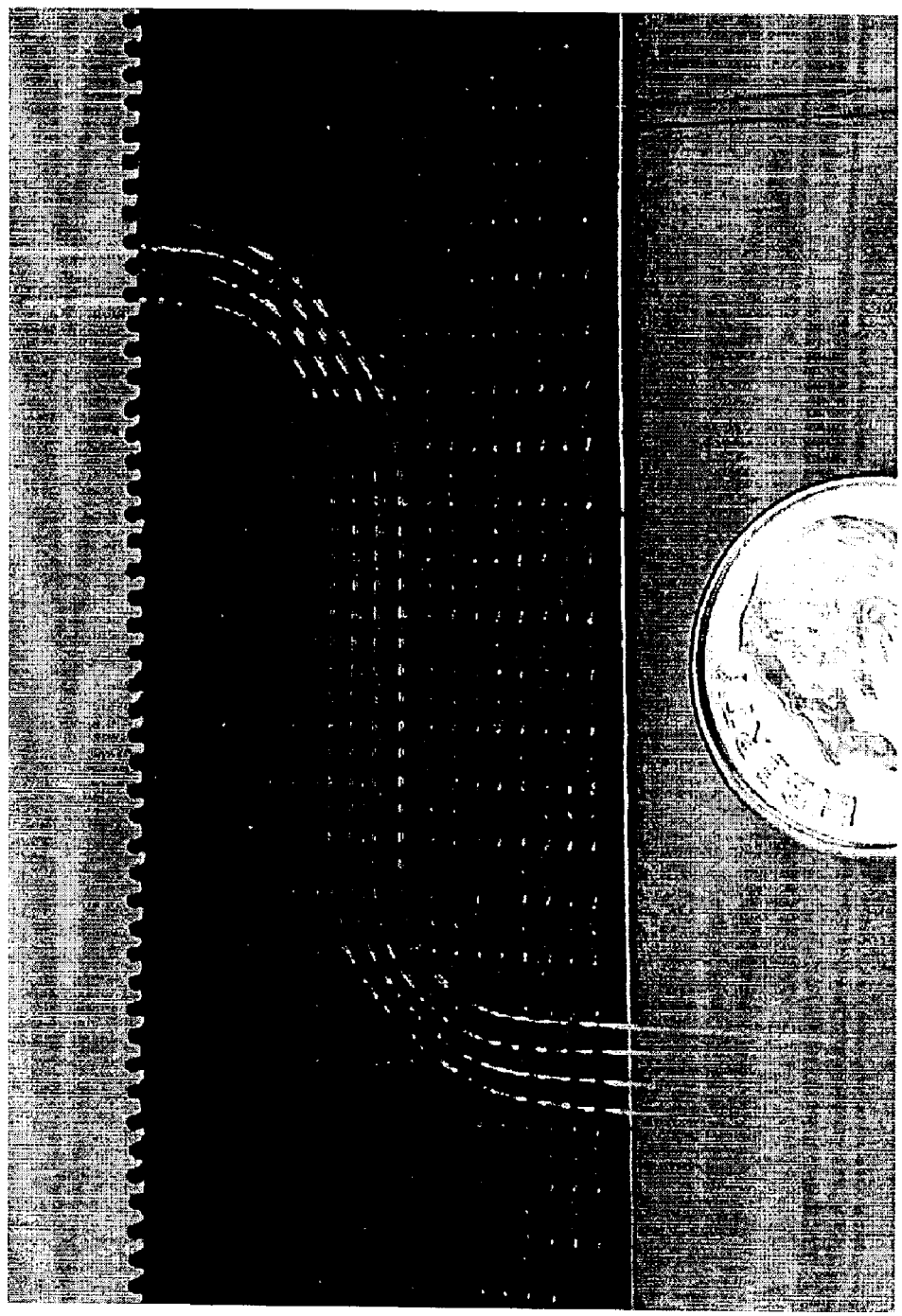
Figure 6C:
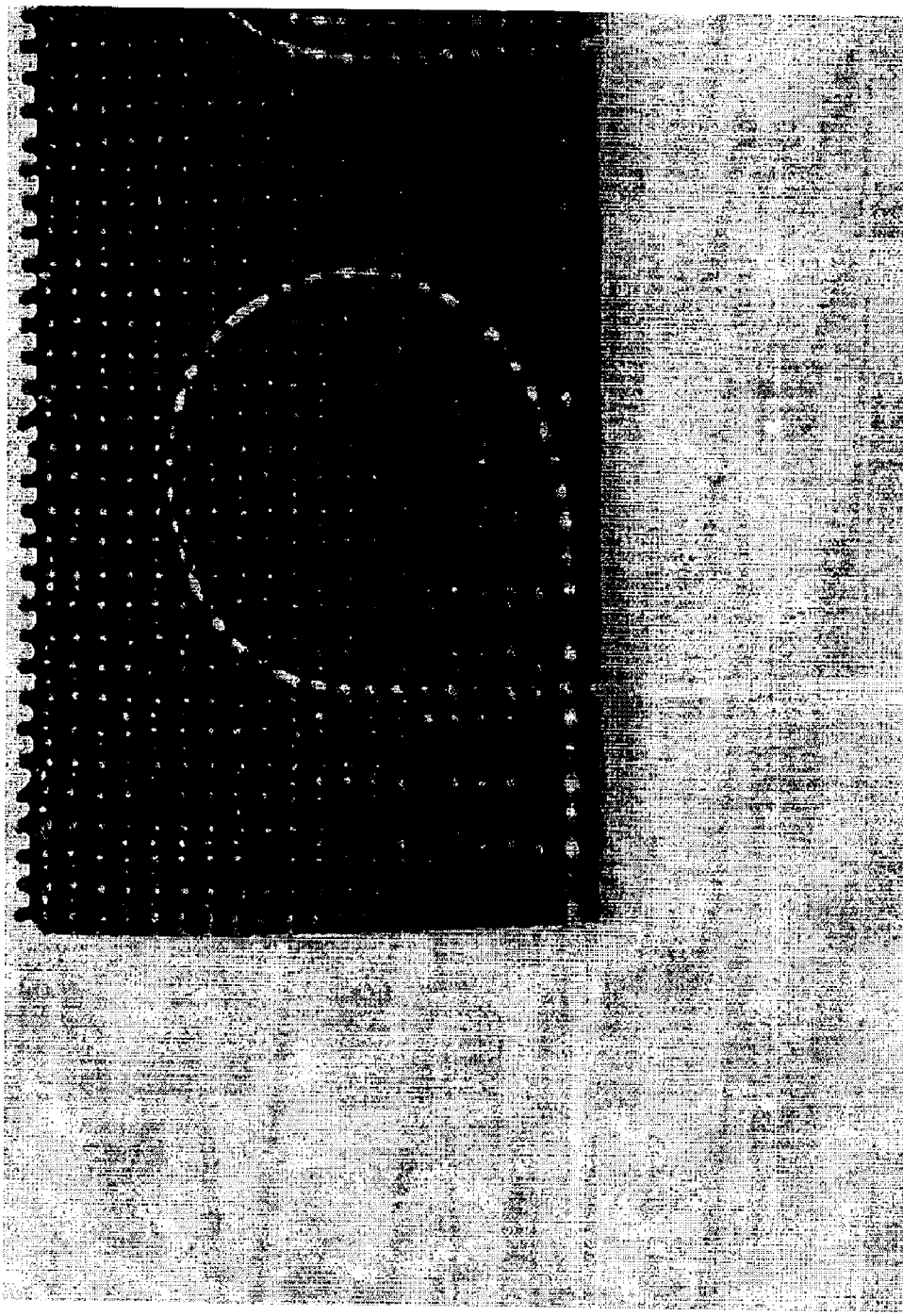

FIGS. 1A and 1B illustrate one embodiment of a fiber optic circuit matrix 20 according to the invention which can be used to mechanically manage a plurality of optical fibers to create an optical circuit without requiring the use of adhesive to retain the optical fibers. In the embodiment of FIGS. 1A and 1B, the fiber optic circuit matrix 20 is formed as a panel 22 and includes a backing layer or substrate 24 which has a plurality of resiliently deformable retaining structures 26 extending therefrom. Retaining structures 26 each include a post or stem portion 28 having an enlarged head portion 30. The retaining structures 26 may be grouped in clusters 32 on the substrate 24 (FIGS. 1A and 1B), or the retaining structures 26 may alternately be positioned in a non-clustered arrangement (FIGS. 6A–6C). Optional openings 34 in substrate 24 are provided to increase the flexibility of substrate 24 and reduce the amount of material required to form substrate 24.

Figure 2A:
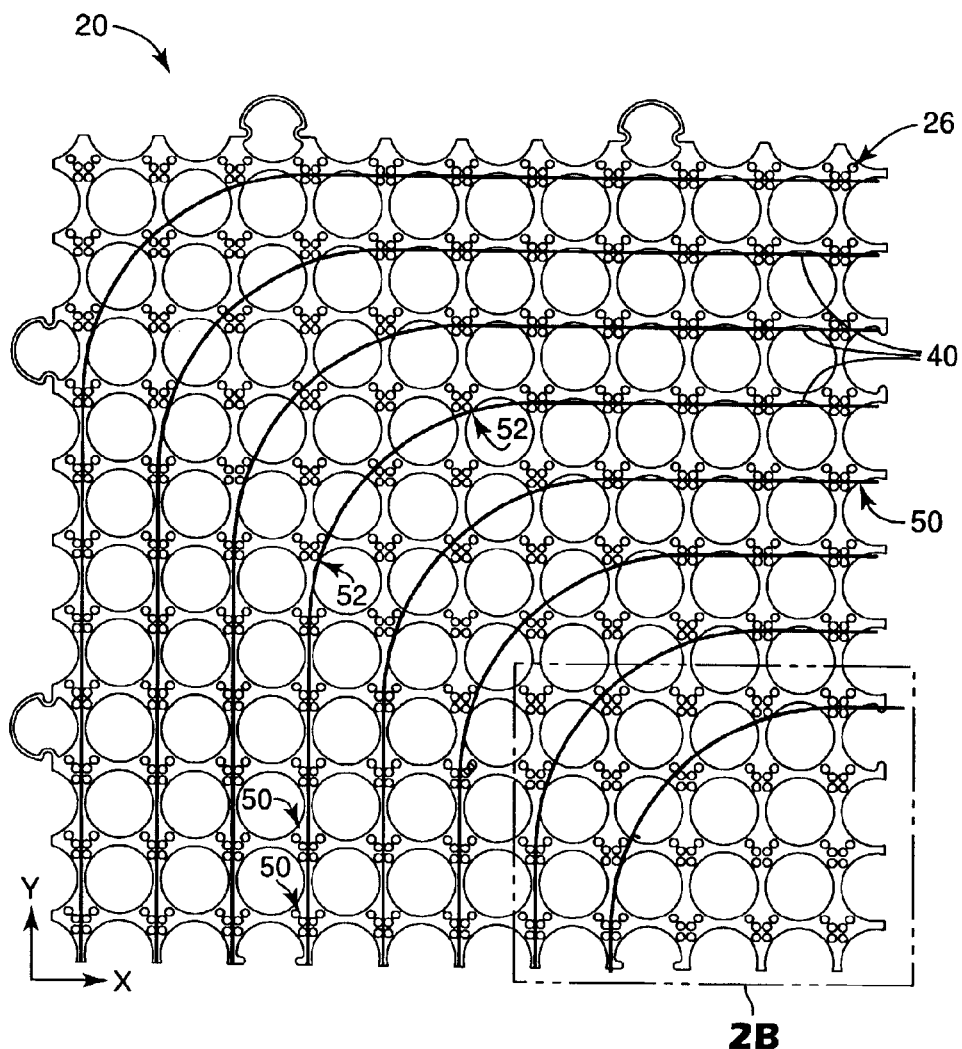
FIG. 2A is a top view of the fiber optic circuit matrix of FIG. 1A.
Figure 2B:
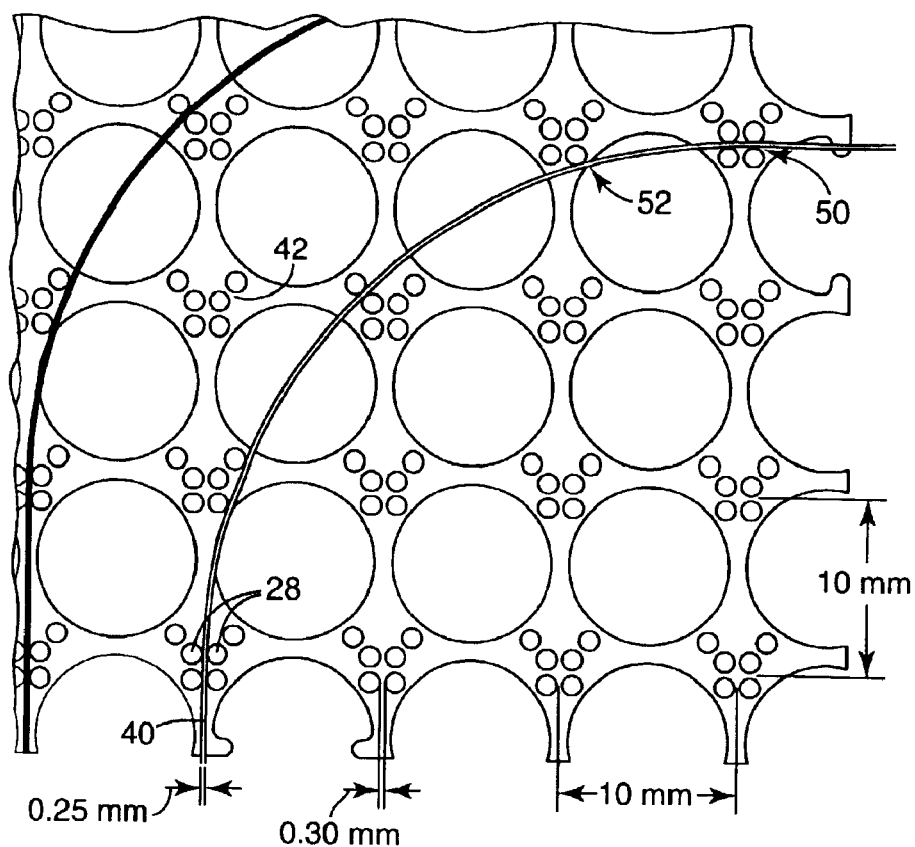
FIG. 2B is a greatly enlarged top view of the lower right corner of the fiber optic circuit matrix of FIG. 2A.

FIGS. 2A and 2B show the fiber optic circuit matrix 20 of FIGS. 1A and 1B with optical fibers 40 routed between the retaining structures 26. In the exemplary embodiment of FIGS. 2A and 2B, the stems 28 of the retaining structures 26 are spaced apart by a distance approximately equal to or slightly larger than the diameter of the optical fiber 40, such that the optical fiber 40 may be freely received in the channel 42 between adjacent stems 28. However, in another embodiment according to the invention, the distance between adjacent stems 28 may be much larger than the diameter of the optical fiber 40, so long as enlarged head portions 30 are shaped and positioned so as to retain optical fiber 40 adjacent substrate 24.

In the embodiment of FIG. 1B, the enlarged head portions 30 of the retaining structures 26 are spaced apart by a distance less than the diameter of the optical fiber 40, such that the enlarged head portions 30 are resiliently displaced as the optical fiber 40 is inserted into or removed from the channel 42 between adjacent stems 28. The optical fibers are thus held in the desired pattern on the fiber optic circuit matrix 20 by the stems 28 of the retaining structures 26, and are held adjacent the fiber optic circuit matrix 20 by the enlarged head portions 30 of the retaining structures 26.

Beneficially, the optical fibers 40 are not rigidly fixed relative to the fiber optic circuit matrix 20 or other optical fibers. That is, the optical fibers 40 forming the optical circuit are loosely retained and movable with respect to the fiber optic circuit matrix 20 and other optical fibers 40. Thus, even after assembly of an optical circuit it is possible to add, remove, or replace an optical fiber to repair or update the circuit design. In addition, if the optical circuit assembly is bent or forced to conform to a non-planar surface, the optical fibers may move or slide relative to the fiber optic circuit matrix 20 and other fibers, and thus experience reduced levels of stress and corresponding optical losses. Further, the relative movement between the fiber optic circuit matrix 20 and the individual fibers reduces or eliminates optical losses associated with temperature induced stresses or microbending stresses, such as when fibers cross over each other due to requirements of the circuit pattern.

As compared to the routing of electrically conductive wires and cables, routing of optical fibers has the additional constraint of a "minimum bend radius". The minimum bend radius for an optical fiber 40 depends upon a variety of both mechanical and optical factors. The mechanical factors include the proof stress to which the optical fiber 40 was tested, the diameter of the glass portion of the optical fiber 40, the environmental conditions the optical fiber 40 is expected to perform under, and the period of time the optical fiber 40 is expected to survive at the bend radius. If the fiber is subjected to bending beyond the limits that these conditions dictate, the fiber will fail by breaking. The primary optical factor limiting the bend radius of the optical fiber 40 is the numerical aperture, a measure of how tightly the light is bound within the core of the fiber. If an optical fiber 40 is bent in a curve having a radius less than its minimum optical bend radius, some of the light traveling through the optical fiber 40 begins to leak out the side of the fiber, thereby weakening the optical signal. As the radius of the bend becomes smaller, the optical loss increases until the level of signal available is no longer useable. The particular construction of the optical fiber 40 determines whether the mechanical or optical factors will ultimately limit the minimum bend performance of the fiber. Therefore, to maintain the performance of an optical fiber 40, both mechanically and optically, it is desirable to ensure that the fiber is not bent in a radius smaller than its minimum bend radius.

The retaining structures 26 of the fiber optic circuit matrix 20 are positioned and spaced on the substrate 24 such that an optical fiber 40 may be routed through and around the retaining structures 26 without violating the minimum bend radius of the fiber 40. In one embodiment according to the invention, the retaining structures 26 are grouped in clusters 32, and the clusters 32 are spaced from each other by a fraction of the minimum bend radius of the optical fibers to be used in the circuit. For example, the clusters 32 of retaining structures 26 may be spaced from each other by a distance in the range of 1/10 to 1/2 or more of the minimum bend radius. The spacing of the clusters 32 will affect the number of retaining or support points afforded to the optical fiber 40 by the retaining structures 26 as the fiber is routed across the fiber optic circuit matrix 20. As the spacing of the clusters 32 decreases, more retaining or support points will be provided to the fiber 40. At the same time, however, the adaptability of the fiber optic circuit matrix 20 to different circuit designs will generally decrease.

In the exemplary embodiment of FIGS. 2A and 2B, the fiber optic circuit matrix 20 is shown as used with optical fibers having a minimum bend radius of 30 mm. The optical fibers have a diameter of 0.25 mm, while the distance between stems 28 of adjacent retaining structures 26 is on the order of 0.30 mm. The clusters 32 of retaining structures 26 are spaced 10 mm apart (i.e., ⅓ of the minimum bend radius). As the optical fibers are routed across the fiber optic circuit matrix 20, the optical fibers are either positioned in channels 42 between pairs of retaining structures 26 (as at points 50), or are supported against individual retaining structures 26 (as at points 52). As can be seen, the bend radius of the optical fibers does not become smaller than the 30 mm minimum bend radius.

Figure 3A:
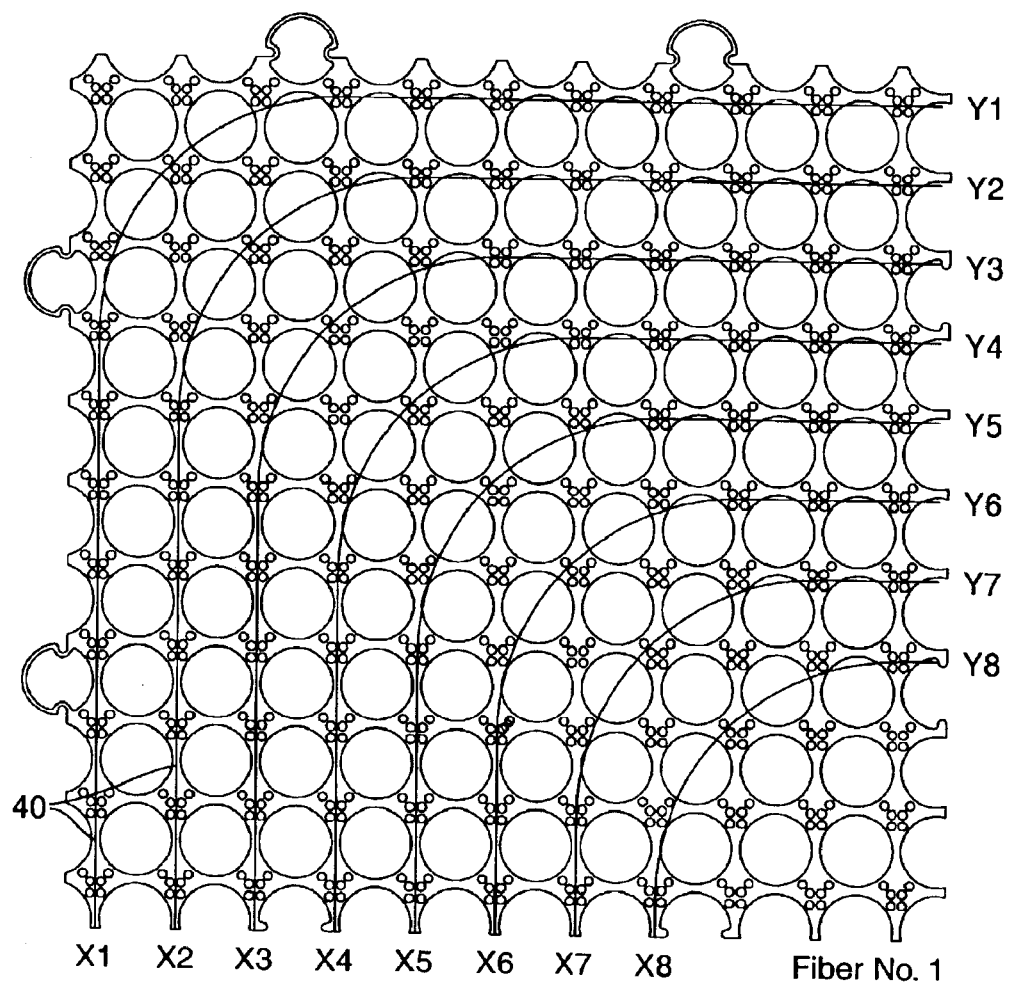
FIGS. 3A–3H are top views of the fiber optic circuit matrix of FIG. 2A, showing the routing of multiple optical fibers in a perfect shuffle circuit.
Figure 3B:
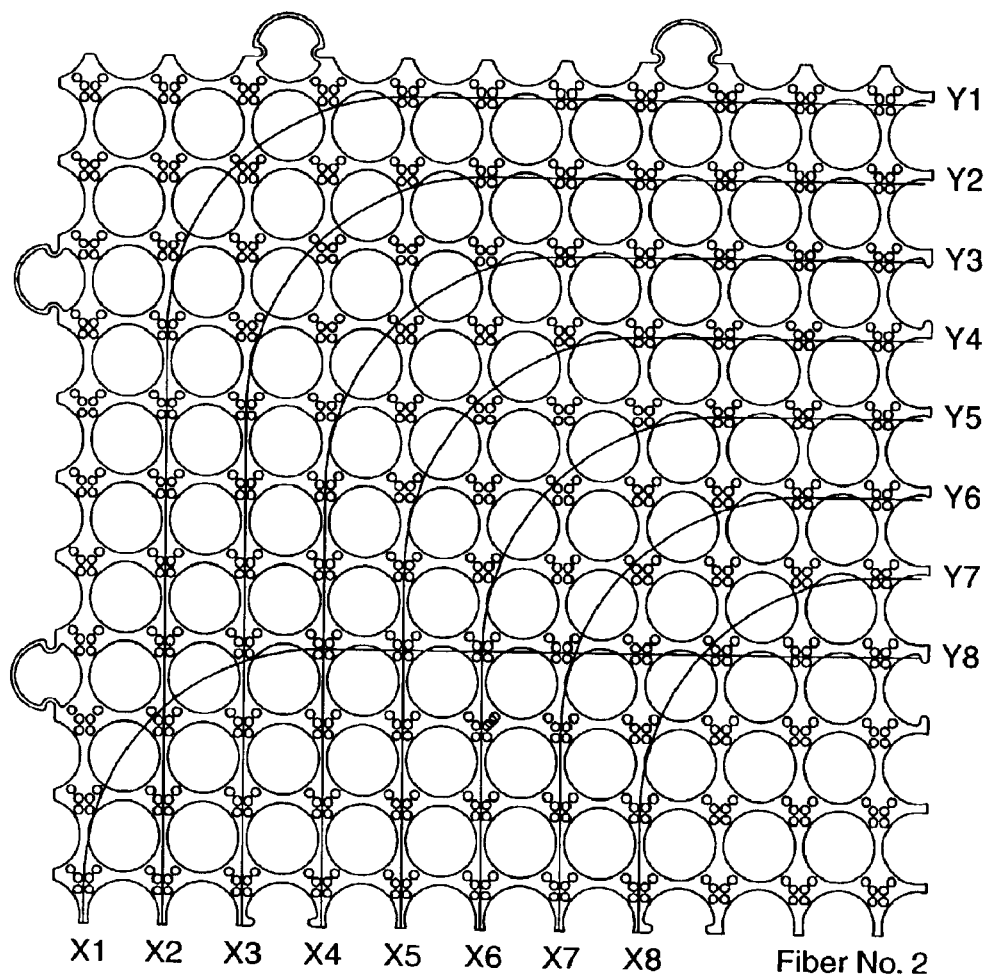
Figure 3C:
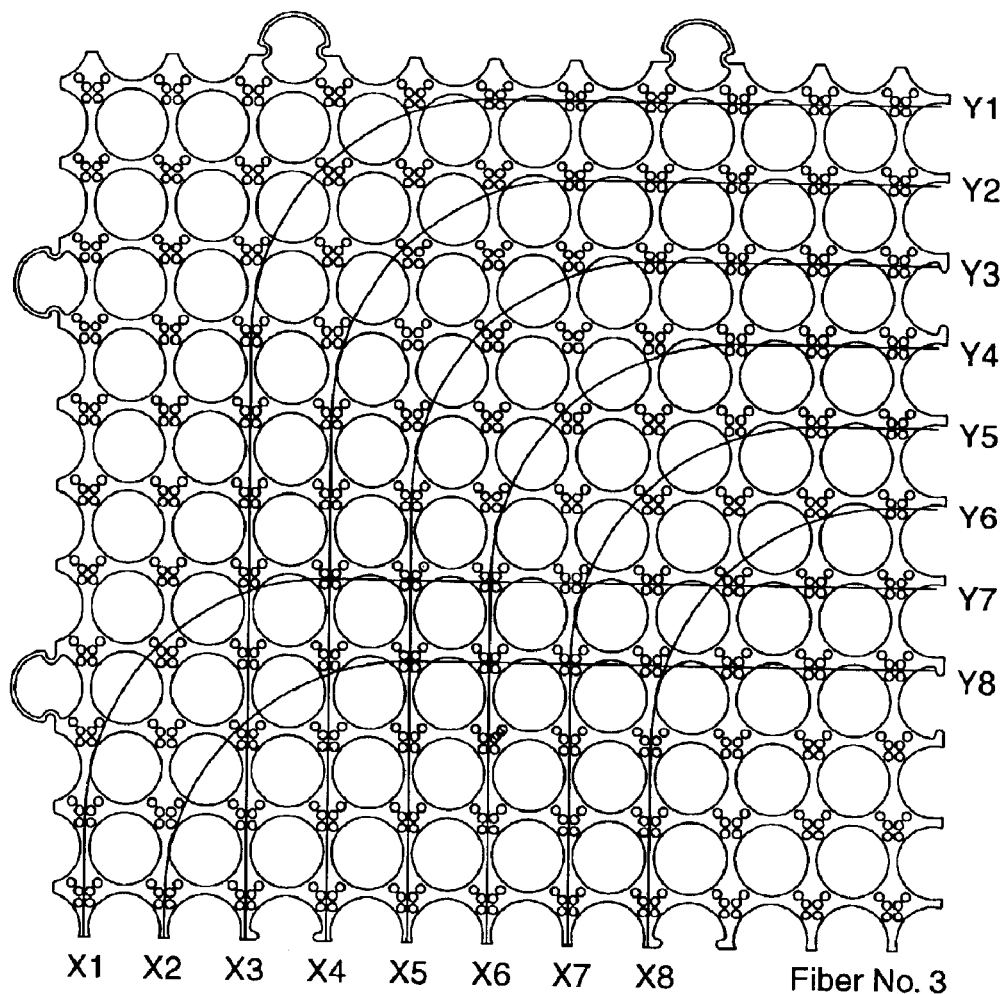
Figure 3D:
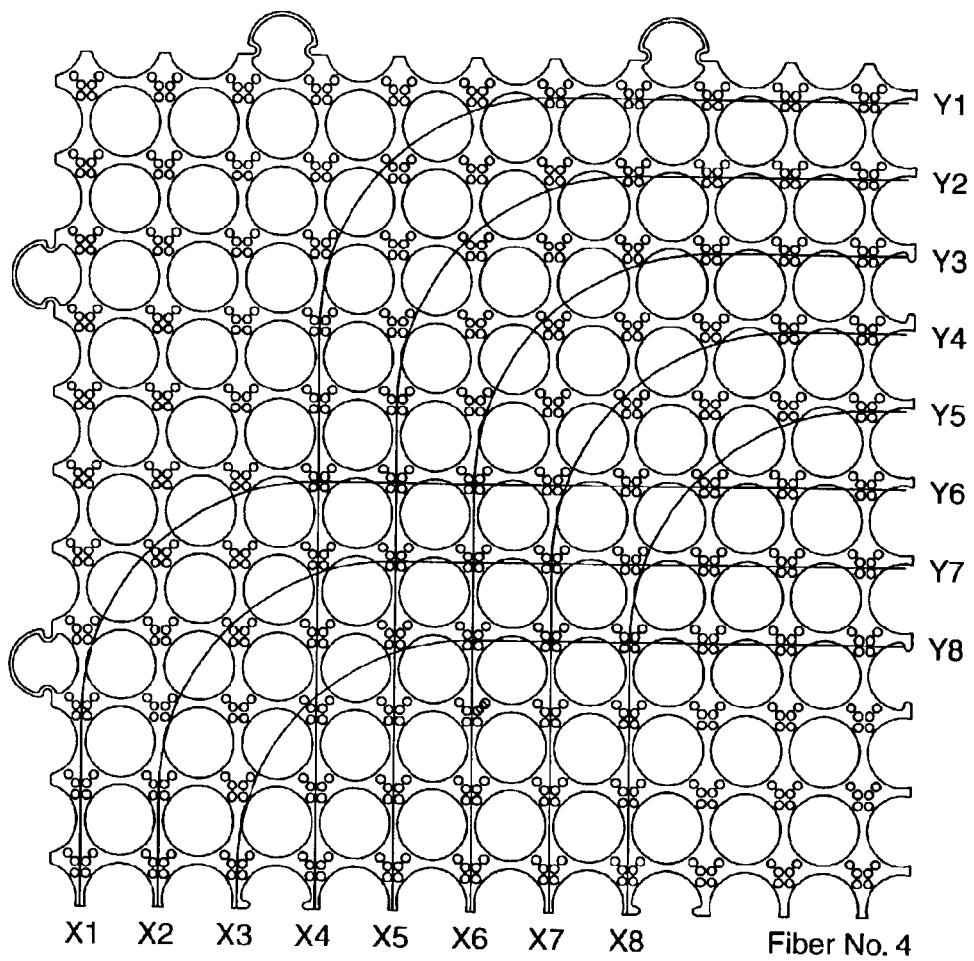
Figure 3E:
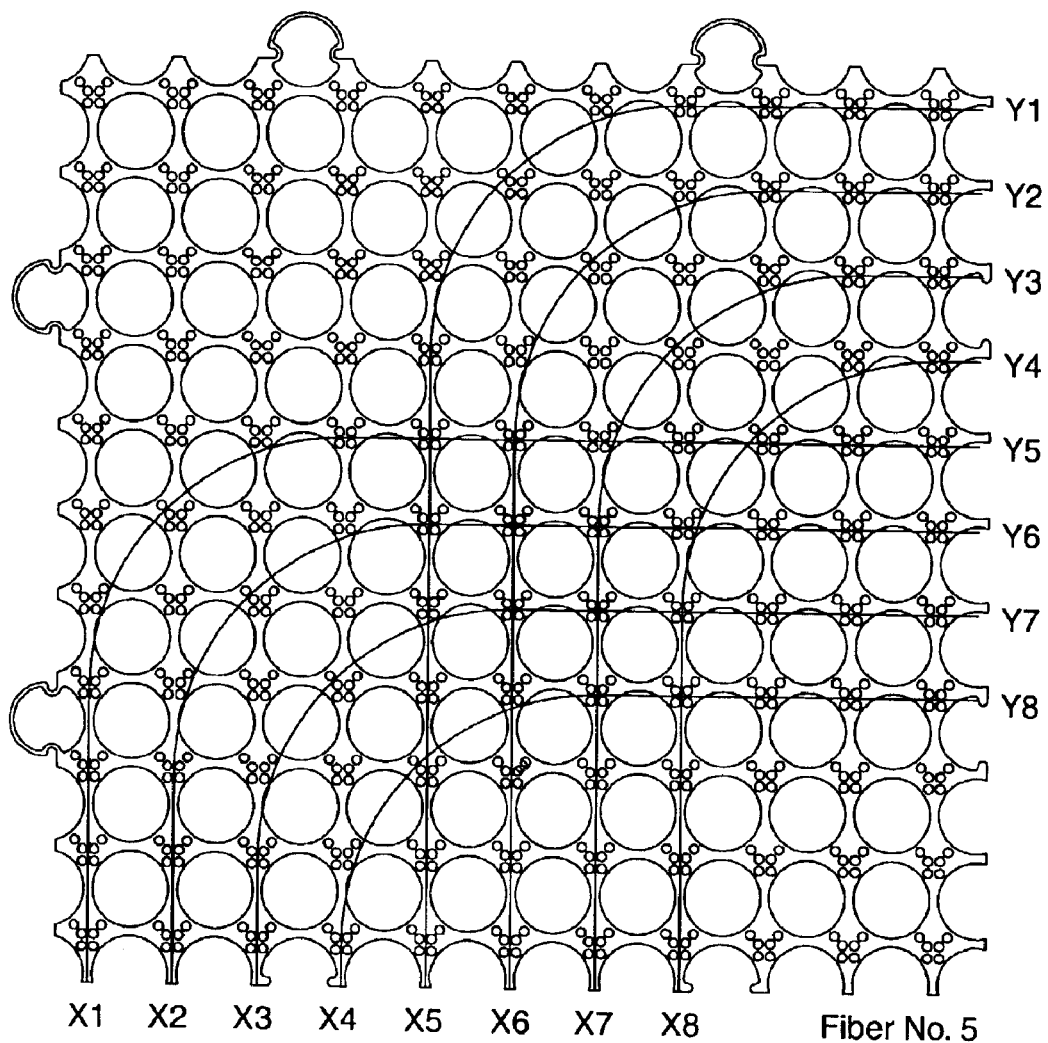
Figure 3F:
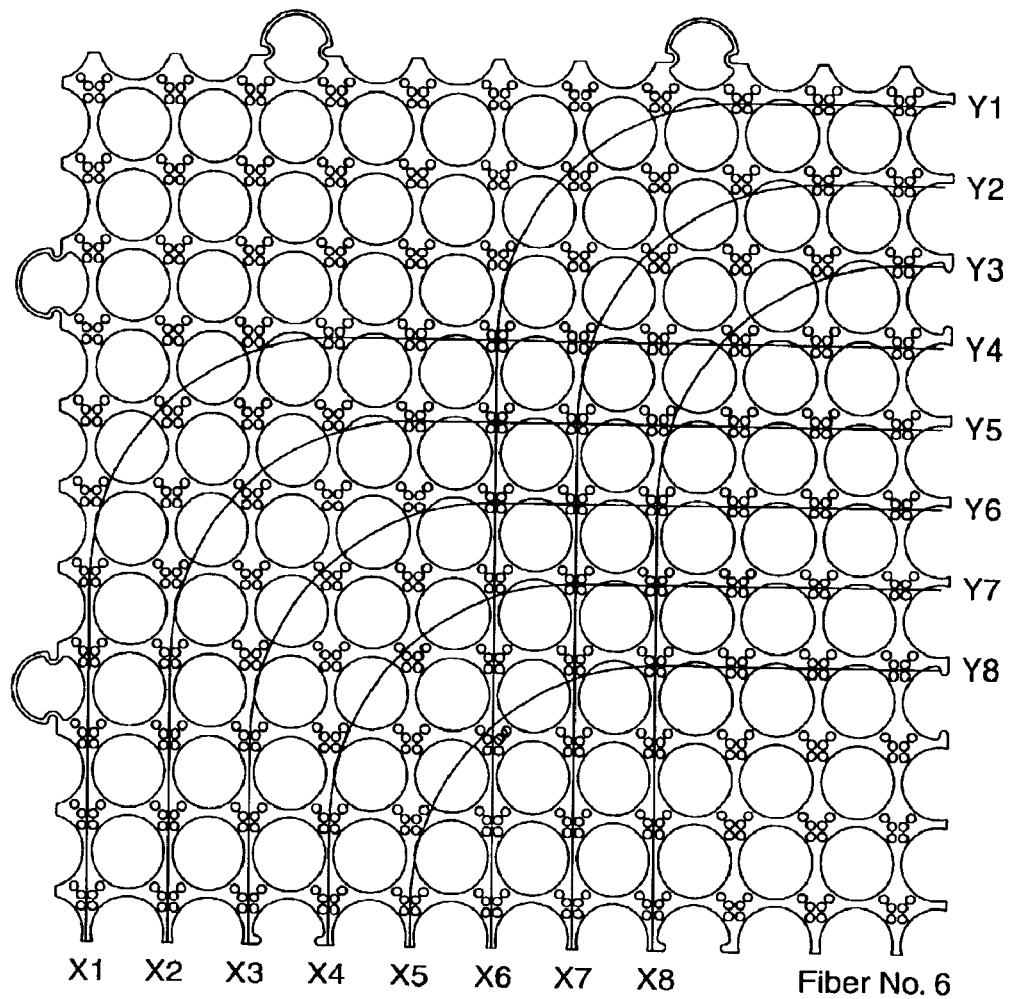
Figure 3G:
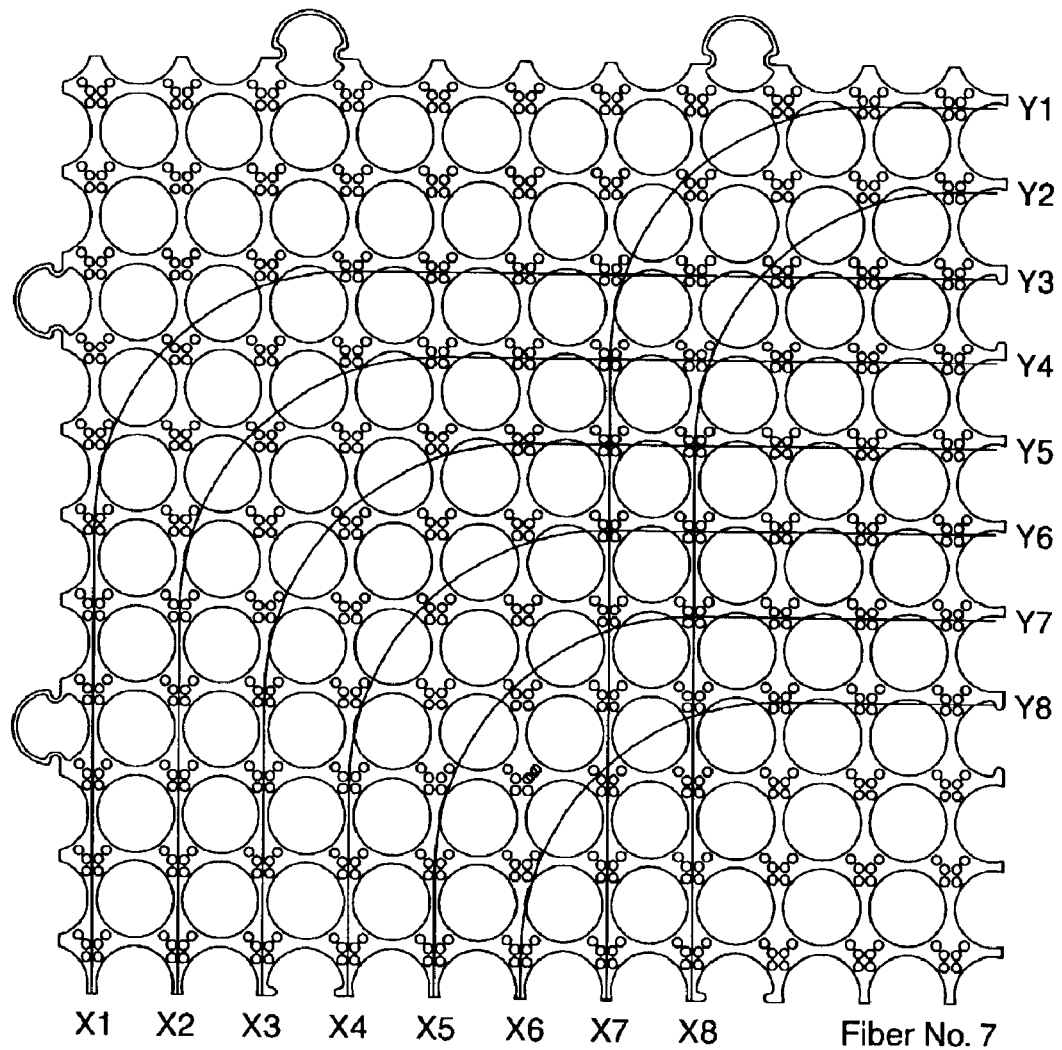
Figure 3H:
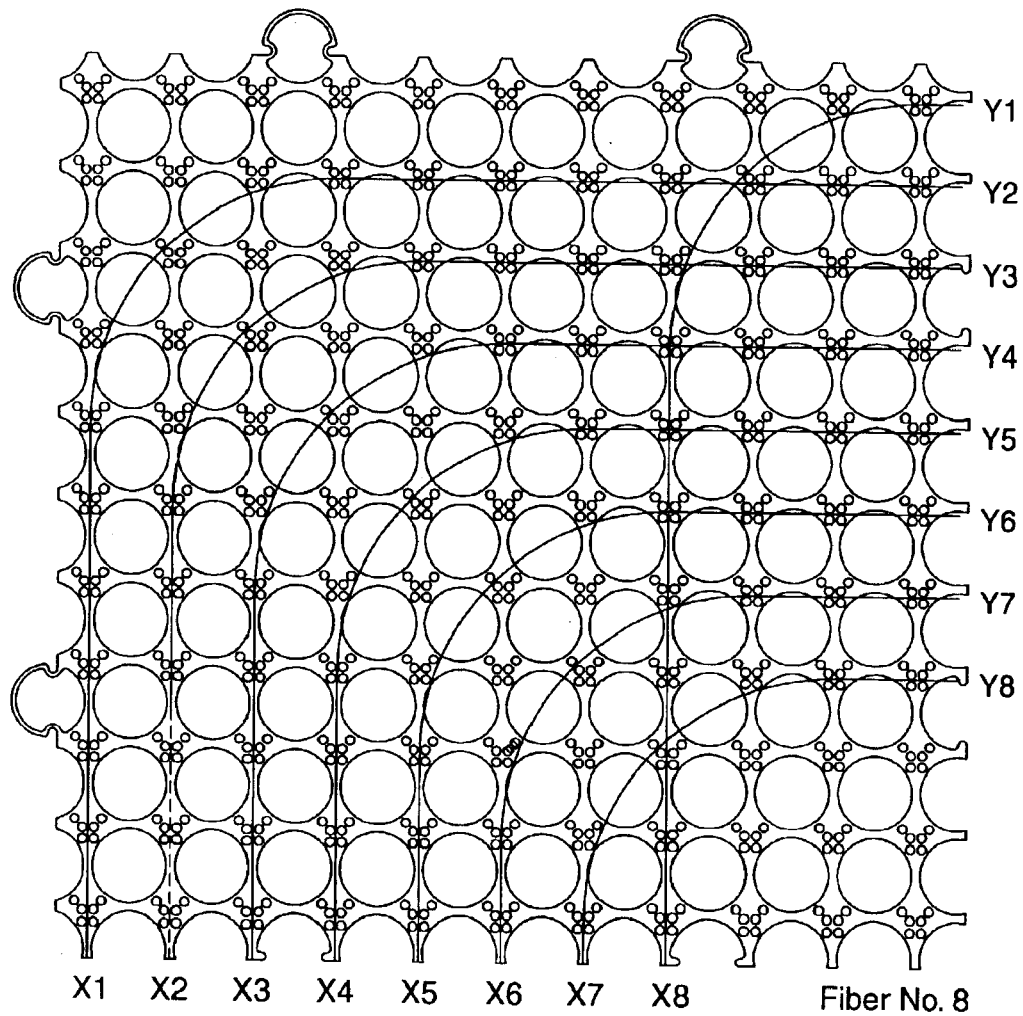
Figure 31:
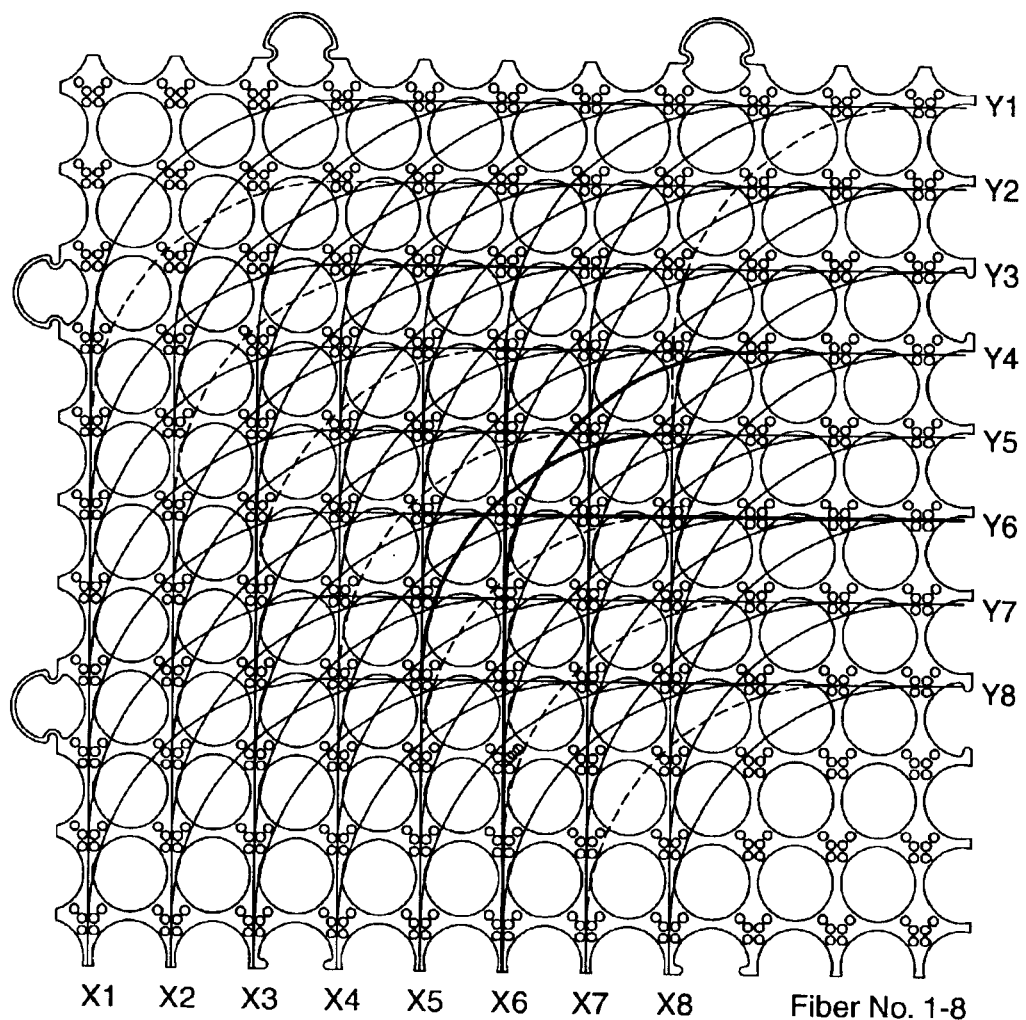

The fiber optic circuit matrix 20 described herein is useful for a wide variety of different circuit designs and fiber routes. As an example, FIGS. 3A–3I illustrate an 8×8 "perfect" optical shuffle transition that requires the routing of 64 different optical fibers. Perfect shuffles are well known and understood by those skilled in the art. The illustrated perfect shuffle transition occurs between eight "input" fiber optic cables (X1, X2, ..., X8) and eight "output" fiber optic cables (Y1, Y2, ..., Y8), where each cable is comprised of eight individual optical fibers. The eight fibers of each input cable are routed to different output cables, such that one fiber 40 from each input cable Xm is routed to each of output cables Y1 through Y8. FIGS. 3A–3H illustrate one possible routing pattern for each of fibers 1 through 8, respectively, of the cables X1 through X8. Each of FIGS. 3A through 3H show one fiber from each of cables X1 through X8. FIG. 3I illustrates all of the 64 fibers (eight cables each with 8 fibers) in the completed shuffle.

Figure 4:
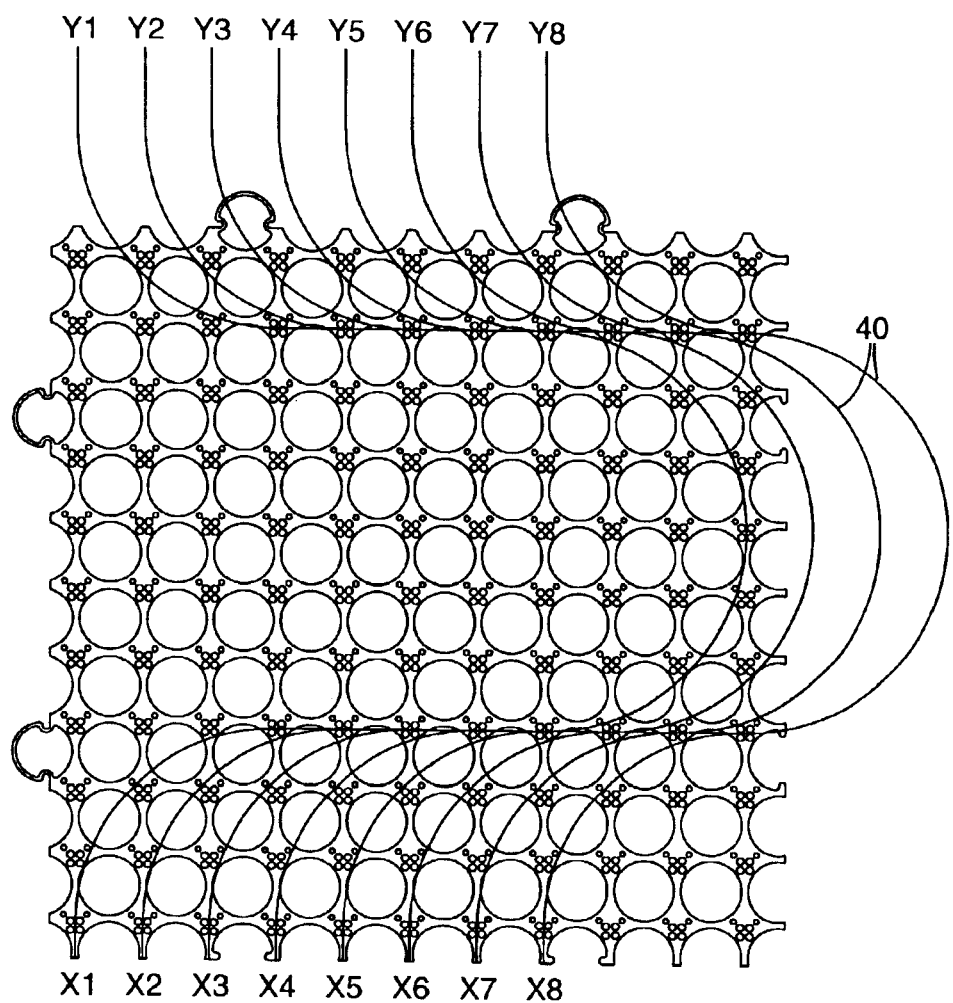
FIG. 4 is a top view of the fiber optic circuit matrix of FIG. 2A, showing another possible optical circuit.

Another exemplary circuit design is illustrated in FIG. 4. As seen in FIG. 4, it is not necessary that the optical fibers remain entirely on fiber optic circuit matrix 20, and the optical fibers may make multiple turns as they are routed across the circuit matrix 20.

As can be seen from examining FIGS. 3I and 4, circuit designs may require that a plurality of fibers be positioned on top of each other, either in an aligned orientation in the same channel 42 or in a crossing orientation at the intersection of two channels 42. Such stacking occurs, for example, at the points where multi-fiber optical cables enter or exit the fiber optic circuit matrix 20. By adjusting the geometry and pitch of the retaining structures 26 and how they are positioned on the substrate 24, multiple optical fibers 40 can be placed into the channels 42 formed between the retaining structures 26. For example, subject to manufacturing limitations, the stems 28 of the retaining features 26 may be made appropriately tall to accommodate the desired number of stacked optical fibers 40 in the channels 42 between adjacent retaining structures 26.

When the retaining structures 26 are arrayed in the X and Y directions, the channels 42 will naturally also be formed in the X and Y directions, and optical fibers can be placed in any of these channels 42. In fabricating the fiber optic circuit matrix 20, the retaining structures 26 and/or clusters 32 of retaining structures 26 may be positioned and spaced on the substrate 24 such that the channels 42 (and thus optical fibers 40) are spaced at the desired pitch for termination. If different termination styles are to be employed, the retaining structures 26 on the substrate 24 can be designed to have a different pitch in each of the X and Y directions.

In the exemplary embodiment of FIG. 1A, the retaining structures 26 are illustrated as posts or stems 28 having an enlarged head portion 30. The panel 22 having retaining structures 26 shown in FIG. 1 could be made in a variety of manners. In one embodiment, posts 28 and enlarged head portions 30 are formed as described in U.S. Pat. No. 5,077,870, the disclosure of which is incorporated herein by reference. Using the method described in U.S. Pat. No. 5,077,870, panel 22 is molded with integral simple tapered posts 28 having no enlarged head portions 30. The application of heat and pressure to the top of the posts 28 after molding provides enlarged head portions 30 on the posts 28 to retain the fibers between the posts 28.

Figure 5A:
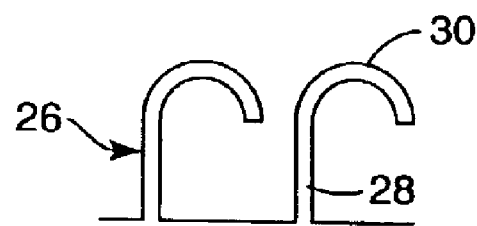
FIGS. 5A–5D illustrate additional embodiments of retaining features according to the invention.
Figure 5B:
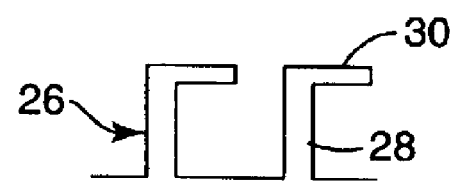
Figure 5C:
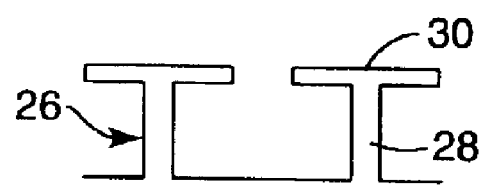
Figure 5D:
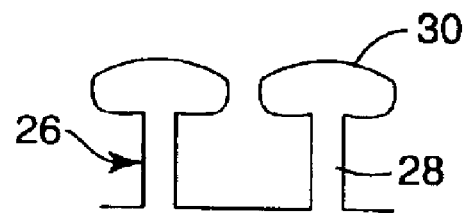

Multiple other retaining structure constructions and methods for forming retaining structures may be used, other than the mushroom shape illustrated in FIG. 1B and discussed above. Alternate retaining structure constructions are shown and taught in U.S. Pat. No. 6,367,128, the disclosure of which is incorporated herein by reference. For example, as illustrated in FIGS. 5A–5D, the retaining structures 26 may alternately have a hook shape (FIG. 5A), an inverted L-shape (FIG. 5B) with a single flange extending from the stem, a T-shape (FIG. 5C) with more than one flange extending from the stem, or a bulb shape (FIG. 5D). The flanges in FIG. 5C may either be symmetrical or asymmetrical. The exemplary retaining structures 26 of FIGS. 5A–5C may be formed using the methods of U.S. Pat. No. 6,367,128, while the structure of 5D may be formed using methods like that described in U.S. Pat. No. 5,077,870.

The various retaining structure constructions are not intended to be limiting and are exemplary only. The retaining structures 26 may also be separately formed from the substrate 24 and added to substrate 24 to form a composite structure. Those skilled in the art will recognize many variations of retaining structures 26 which may be constructed in a variety of manners without departing from the scope and spirit of the invention. In general, the retaining structures 26 may be similar in appearance and construction to self-mating mechanical fasteners. For a more detailed description of self-mating mechanical fasteners, reference should be made to the above-referenced U.S. Pat. Nos. 6,367,128 and 5,077,870, the disclosures of which have been incorporated herein by reference.

In one embodiment according to the invention, the retaining structures 26 are fabricated with self-mating properties such that multi-layer optical circuits can be fabricated by mechanically attaching multiple substrates together. The routing of optical fibers on a fiber optic matrix constructed with self-mating mechanical fasteners is illustrated in FIGS. 6A–6C. In FIGS. 6A–6C, the retaining structures are uniformly spaced (non-clustered), and the optical fibers are routed between the retaining structures to form a variety of turns while still meeting the minimum bend radius requirements and not exhibiting additional optical loss. In the embodiments of FIGS. 6A–6C, the self-mating fastener material is available as product number SJ-3780 Type 250 from 3M Company of St. Paul, Minn., U.S.A. The optical fiber is available as product number SMF-28 from Corning Incorporated, Corning, N.Y., U.S.A.

To provide very compact optical circuits, e.g., for telecommunications or data communications applications, it would be desirable to use optical fibers designed to optically and mechanically withstand a small minimum bend radius. Examples of such fibers are described in co-owned and co-pending U.S. patent application Ser. No. 10/172,093, titled "Dual-Band Bend Tolerant Optical Waveguide", the disclosures of which are also incorporated herein by reference.

The fiber optic circuit matrix 20 described herein may be fabricated as an inflexible member or as a flexible member, depending upon the intended use and application of the fiber optic circuit matrix 20. Optical circuits that are fabricated using flexible substrates 24 can be employed in applications where it would be desirable to make a large circuit more compact, for example by rolling the circuit into a tubular shape. Circuits may also be fabricated from a flexible substrate 24 for ease of installation on non-planar surfaces where it is desirable for the circuit to conform to the irregular surface geometry.

Figure 7:
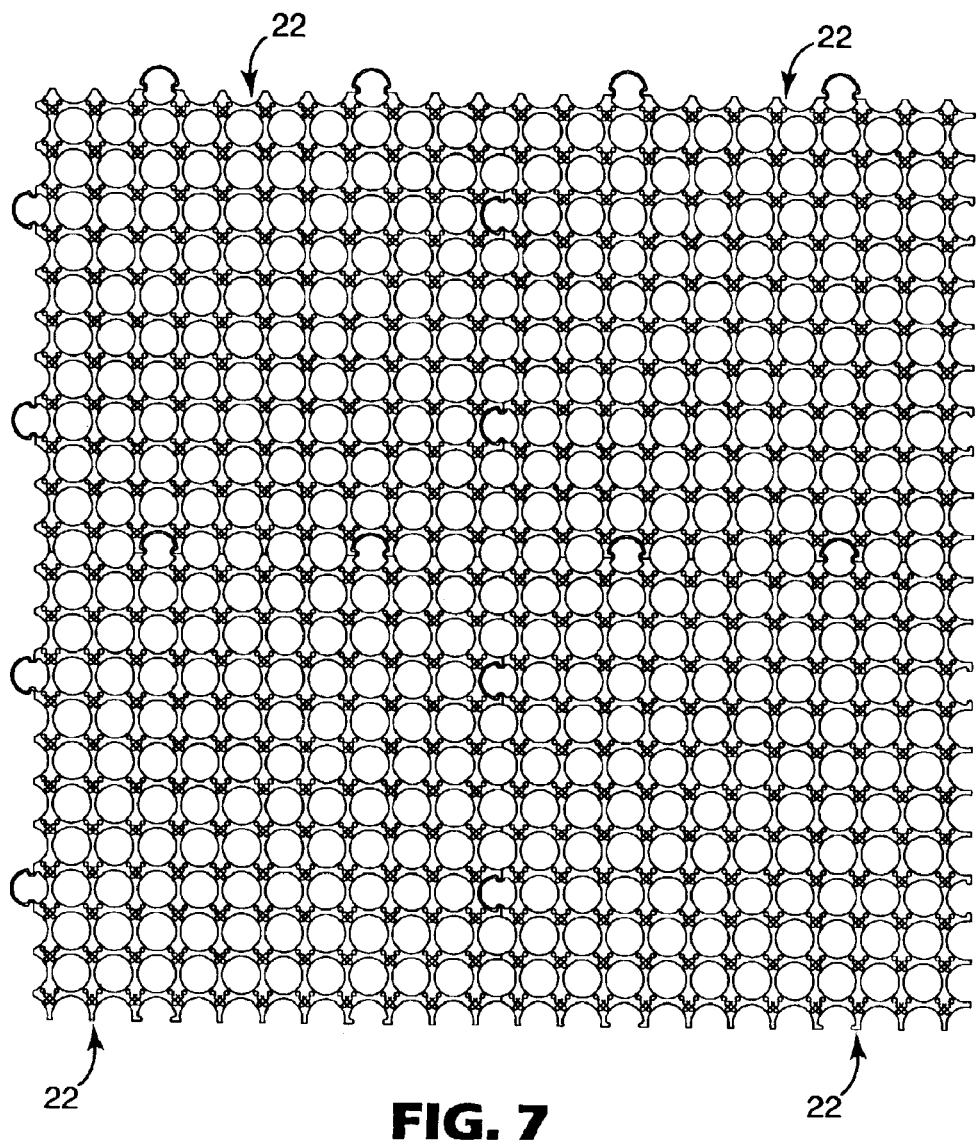
FIG. 7 is a top view of a plurality of interlocked fiber optic circuit matrix panels.

The fiber optic circuit matrix panel 22 may be configured such that multiple panels 22 may be joined to form a larger fiber optic circuit matrix structure. In the embodiment illustrated in FIG. 1A, the panel 22 includes interlocking male and female structures 60 and 62, respectively, on its periphery, such that two or more panels 22 can be secured together. In FIG. 7, four individual panels 22 are shown in an interlocked arrangement. Those skilled in the art will recognize a broad range of variations and alterations that may be made to the interlocking structures without departing from the scope and spirit of the invention, and will further recognize various other means that may be employed to interlock or join a plurality of panels 22.

Figure 8:
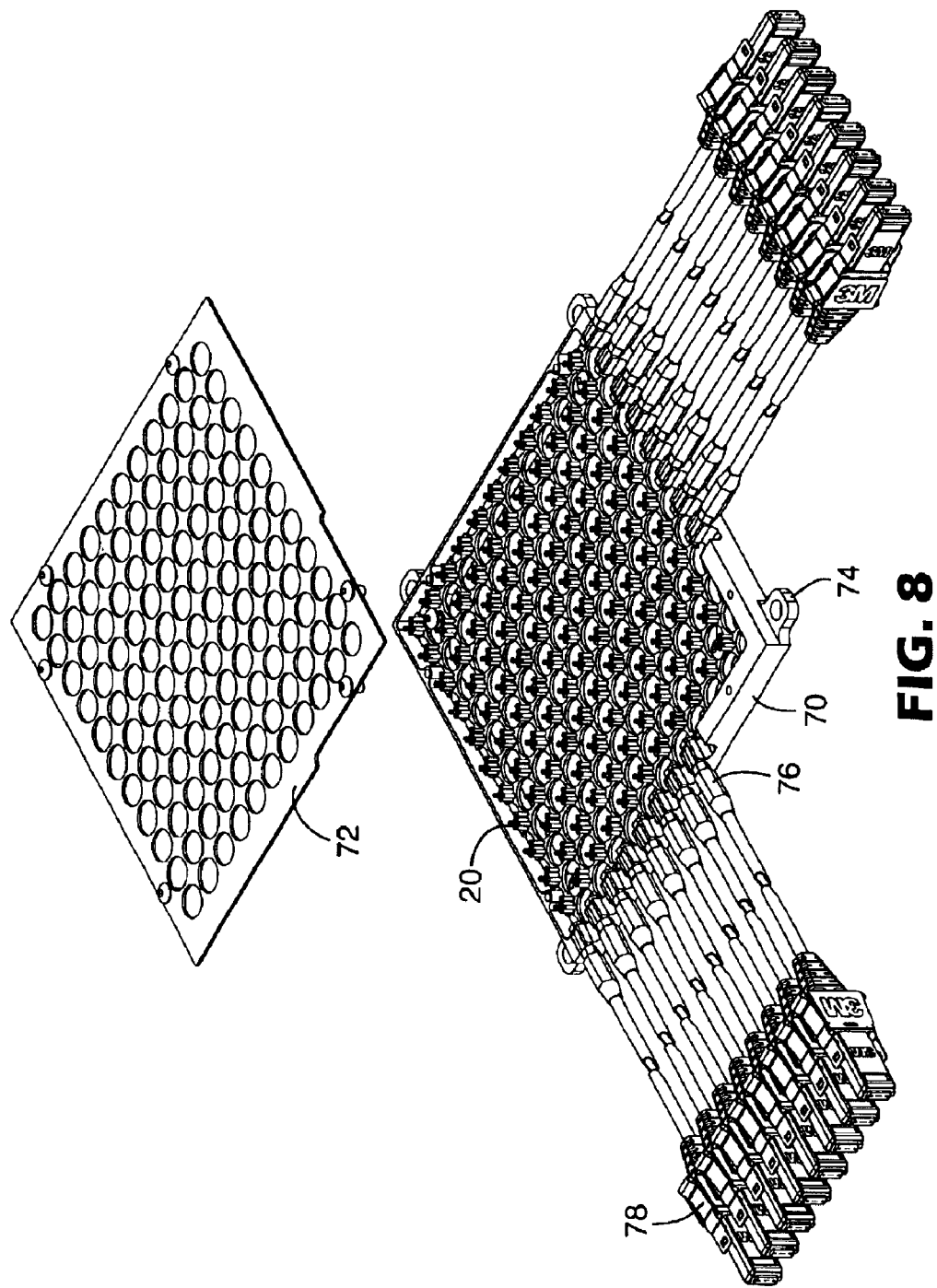
FIG. 8 is a partially exploded perspective view of a packaged optical circuit according to one embodiment of the invention.

After an optical circuit has been created on the fiber optic circuit matrix 20, the optical circuit may be packaged for use. Specifically, as shown in FIG. 8, in one embodiment according to the invention, the fiber optic circuit is packaged in a case 70 and covered with cover 72 for protection. Case 70 may include mounting flanges 74 for securing case 70 to another component (not shown). Case 70 may be adapted to accept ruggedized cable attachments 76, and optical fibers 40 may be terminated using such connectors 78 as is appropriate for the intended application.

Figure 9:
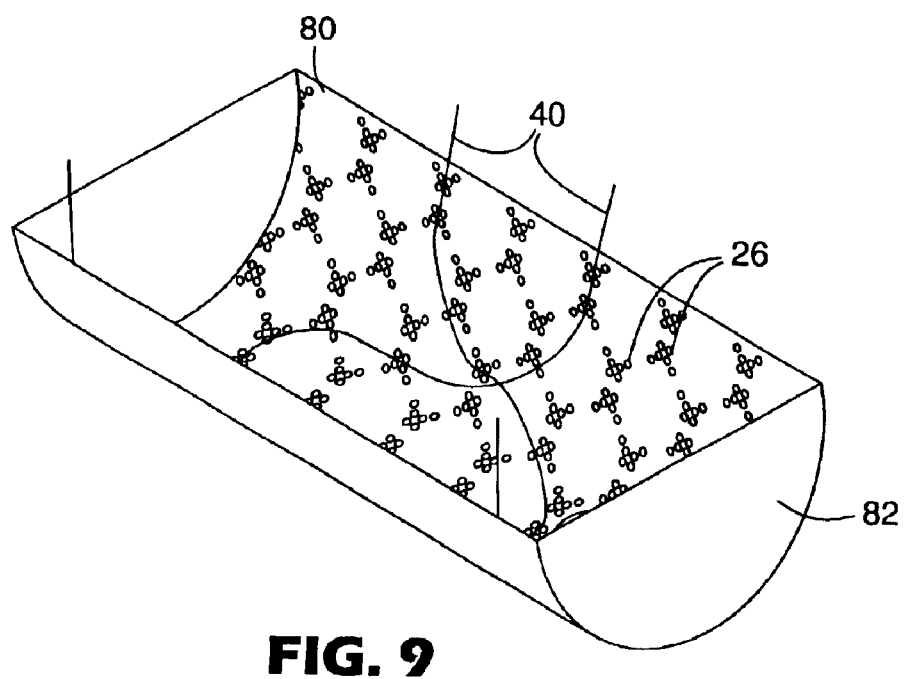
FIG. 9 illustrates retaining features according to the invention integrally formed as part of another device.

In another embodiment according to the invention, the retaining structures 26 are fabricated as integral features on other devices, such that optical circuits may be created directly on those devices. For example, FIG. 9 illustrates retaining structures 26 on a non-planar surface 80 of a device 82. As illustrated in FIG. 9, device 82 is representative of any device or component which may be used with an optical circuit. In this way, optical circuits may be fabricated as special features integral to many diverse components, rather than as stand-alone components. By incorporating optical circuits as an integral part of other existing devices, more compact devices may be developed.

The fiber optic circuit matrix 20 described herein permits the fabrication of an optical circuit without the use of adhesive, and without additional processing steps such as flood coating, curing, or laminating the circuit assembly. If the substrate 24 of the fiber optic circuit matrix 20 on which the optical fibers are patterned is flexible, the resulting optical circuit will also be flexible. In flexing the circuit, the optical fibers are held by, but movable between, the retaining structures 26 such that the optical fibers can themselves move relative to the substrate 24 and other optical fibers. The present invention thus reduces or eliminates stress from bending or conforming the circuit to a nonplanar surface, and further reduces the effects of temperature-induced bending losses.

Although specific embodiments have been illustrated and described herein for purposes of description of the preferred embodiment, it will be appreciated by those of ordinary skill in the art that a wide variety of alternate or equivalent implementations may be substituted for the specific embodiments shown and described without departing from the scope of the present invention. Those with skill in the mechanical, optical, and opto-mechanical arts will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A fiber optic circuit comprising:
   a substrate;
   a plurality of retaining structures on the substrate, wherein the plurality of retaining structures each comprise a stem with an enlarged head wherein the stem is oriented substantially perpendicular to the substrate; and
   at least one optical fiber removably retained adjacent the substrate by the retaining structures, wherein the retaining structures are arranged in a plurality of clusters on the substrate, wherein the clusters are spaced from each other by a distance on the same order of magnitude as a minimum bend radius of the at least one optical fiber, and wherein, in each cluster, a first stem is spaced from an adjacent stem by a distance at least equal to a diameter of the at least one optical fiber, and a first enlarged head is spaced from an adjacent enlarged head by a distance less than the diameter of the at least one fiber.

2. The fiber optic circuit of claim 1, wherein the retaining structures are positioned to form channels therebetween, and wherein the at least one optical fiber is positionable in the channels.

3. The fiber optic circuit of claim 1, wherein the retaining structures are integrally formed with the substrate.

4. The fiber optic circuit of claim 1, wherein, in each cluster, the enlarged heads are resiliently deformable as the at least one optical fiber passes between adjacent heads and wherein the at least one optical fiber is loosely retained between adjacent stems.

5. The fiber optic circuit of claim 1, wherein the clusters are spaced from each other to form a matrix of clusters.

6. The fiber optic circuit of claim 1, wherein each cluster comprises a plurality of guiding channels adapted to guide the at least one optical fiber in more than one direction.

7. The fiber optic circuit of claim 1, wherein the distance between the clusters is in the range of $1/10$ to $1/2$ of the minimum bend radius of the at least one optical fiber.

8. The fiber optic circuit of claim 1, wherein the retaining structures are resiliently deformable.

9. The fiber optic circuit of claim 1, wherein the clusters are arranged on the substrate in a matrix of rows and columns.

10. The fiber optic circuit of claim 1, wherein the enlarged head comprises a flange extending from at least one side of the stem.

11. The fiber optic circuit of claim 1, wherein the enlarged head comprises a mushroom-shaped head.

12. The fiber optic circuit of claim 1, wherein the stem and enlarged head form a T shape.

13. The fiber optic circuit of claim 1, further comprising a second optical fiber retained adjacent the substrate by the retaining structures.

14. The fiber optic circuit of claim 13, wherein the retaining structures are positioned to form channels therebetween, and wherein the optical fibers are positioned in a single channel.

15. The fiber optic circuit of claim 1, wherein the substrate is non-planar.

16. The fiber optic circuit of claim 1, wherein the substrate is flexible.

17. An apparatus for routing an optical fiber, the apparatus comprising;
   a substrate; and
   a plurality of retaining structure clusters on the substrate, wherein the clusters are comprised of at least two retaining structures and are spaced from each other by a distance on the same order of magnitude as a minimum bend radius of the optical fiber, and wherein the at least two retaining structures each comprise a stem with an enlarged head wherein the stem is oriented substanially perpendicular to the substrate, and wherein, in each cluster, a first stem is spaced from an adjacent stem by a distance at least equal to a diameter of the optical fiber, and a first enlarged head is spaced from an adjacent enlarged head by a distance less than the diameter of the optical fiber.

18. The apparatus of claim 17, wherein stem has a circular cross section at its base.

19. The apparatus of claim 17, wherein the retaining structures are resiliently deformable.

20. The apparatus of claim 17, wherein the retaining structures are integrally formed with the substrate.

21. The apparatus of claim 17, further comprising interlocking structures on a periphery of the substrate for joining a plurality of substrates.

22. The apparatus of claim 21, wherein the interlocking structures comprise a male interlock structure on a first peripheral edge of the substrate and a mating female interlock structure on a second peripheral edge of the substrate opposite the first peripheral edge of the substrate.

23. The apparatus of claim 17, wherein the substrate comprises a panel.

24. The apparatus of claim 17, wherein the substrate is flexible.

25. The apparatus of claim 17, wherein the substrate is an integral surface of another device.

26. A panel for routing an optical fiber comprising groups of retaining structures on the panel, wherein the groups of retain structures are arranged in a plurality of clusters on the substrate, the retaining structures each including a stem having an enlarged head portion wherein the stem is oriented substanially perpendicular to the substrate, wherein the stems within each group are spaced from each other by a first distance on the same order of magnitude as the diameter of the optical fiber, and wherein the clusters of retaining structures are spaced from each other by a second distance greater than the first distance, the second distance being on the same order of magnitude as a minimum bend radius of the optical fiber, and wherein, in each cluster, a first enlarged head is spaced from an adjacent enlarged head by a distance less than the diameter of the optical fiber.

27. The panel of claim 26, wherein the second distance is in the range of $\frac{1}{10}$ to $\frac{1}{2}$ of a minimum bend radius of the optical fiber.

28. The panel of claim 26, wherein the retaining structures are resiliently deformable.

29. The panel of claim 26, wherein the head portions of the retaining structures within each group are spaced from each other by less than the diameter of the optical fiber.

30. A fiber optic circuit device, comprising:
   a substrate; and
   a plurality of retaining structure clusters arranged on the substrate to loosely retain at least one optical fiber, wherein each cluster comprises a plurality of resiliently deformable retaining structures wherein the plurality of the retaining structures each comprise a stem with an enlarged head, wherein the clusters are spaced from each other by a distance on the same order of magnitude as a minimum bend radius of the at least one optical fiber, and wherein each cluster comprises a plurality of guiding channels adapted to guide the at least one optical fiber in more than one direction.

31. The fiber optic circuit device of claim 30, and wherein, in each cluster, a first stem is spaced from an adjacent stem by a distance at least equal to a diameter of the at least one optical fiber, and a first enlarged head is spaced from an adjacent enlarged head by a distance less than the diameter of the at least one fiber.

32. The fiber optic circuit device of claim 31, wherein a first cluster includes a first channel to guide a first optical fiber in a first direction, wherein the first cluster includes a second channel to guide a second optical fiber in a transverse direction, and wherein the first and second optical fibers are loosely retained in the first cluster.

* * * * *

UNITED STATES PATENT AND TRADEMARK OFFICE
CERTIFICATE OF CORRECTION

PATENT NO.    : 6,917,746 B2
DATED         : July 12, 2005
INVENTOR(S)   : Simmons, Richard L.

It is certified that error appears in the above-identified patent and that said Letters Patent is hereby corrected as shown below:

Column 9,
Lines 13 and 44, delete "substanially" and insert -- substantially -- therefor.
Line 41, delete "retain" and insert -- retaining -- therefor.

Signed and Sealed this

Twenty-seventh Day of September, 2005

JON W. DUDAS
*Director of the United States Patent and Trademark Office*